US010230673B1

(12) United States Patent
Lewis et al.

(10) Patent No.: US 10,230,673 B1
(45) Date of Patent: Mar. 12, 2019

(54) METHODS, SYSTEMS, AND MEDIA FOR GENERATING CONTEXTUALLY RELEVANT MESSAGES

(71) Applicant: Google LLC, Mountain View, CA (US)

(72) Inventors: Justin Lewis, Marina del Rey, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 271 days.

(21) Appl. No.: 14/715,247

(22) Filed: May 18, 2015

(51) Int. Cl.
*G06F 15/173* (2006.01)
*H04L 12/58* (2006.01)

(52) U.S. Cl.
CPC .............. *H04L 51/10* (2013.01); *H04L 51/32* (2013.01)

(58) Field of Classification Search
CPC ................................ H04L 51/32; H04L 51/10
USPC ........................................ 709/204, 223, 226
See application file for complete search history.

(56) References Cited

U.S. PATENT DOCUMENTS

| | | |
|---|---|---|
| 7,761,507 B2 | 7/2010 | Herf et al. |
| 2006/0224674 A1* | 10/2006 | Buchheit ............. G06F 11/1446 709/206 |
| 2014/0125753 A1* | 5/2014 | Rossano ................. H04L 51/38 348/14.02 |
| 2015/0182861 A1* | 7/2015 | Winter ............... G06Q 30/0261 705/14.14 |

OTHER PUBLICATIONS

Chuah, Mei, "Reality Instant Messaging: Injecting a Dose of Reality into Online Chat", in the Proceedigns of CHI 2003: New Horizons, Ft. Lauderdale, FL, US, Apr. 5-10, 2003, pp. 926-927.

* cited by examiner

*Primary Examiner* — Joseph E Avellino
*Assistant Examiner* — Marshall M McLeod
(74) *Attorney, Agent, or Firm* — Byrne Poh LLP

(57) ABSTRACT

Methods, systems, and media for generating contextually relevant messages are provided. In some embodiments, a method for generating contextually relevant messages is provided, the method comprising: requesting content from a content source; receiving a content item; causing the content item to be presented using a display device; causing an endorsement indication corresponding to an endorsing user to be concurrently presented with the content item, wherein a user associated with the request for content and the endorsing user are social connections; receiving user input selecting the endorsement indication; causing a temporary messaging interface including a temporary message from the user to the endorsing user to be presented; causing a permanent message to be created based on the temporary message and received user input; and causing the permanent message to be presented to the endorsing user.

21 Claims, 6 Drawing Sheets

METHODS, SYSTEMS, AND MEDIA FOR GENERATING CONTEXTUALLY RELEVANT MESSAGES

TECHNICAL FIELD

The disclosed subject matter relates to methods, systems, and media for generating contextually relevant messages.

BACKGROUND

Consumers of content on the Internet often endorse the content by "liking" the content, commenting on the content, etc. While such an endorsement may be viewable by social connections of a consumer that provided the endorsement, it is often difficult for the social connection to engage directly when viewing the consumer's endorsement due to lack of context in an unrelated message to the consumer, or the extra work it would take to provide such context. This may result in many chances for engagement between the social connection and the consumer to be missed or lost, which can in turn lead to less use of the platform providing the content than could be realized with greater engagement by consumers and their social connections.

Accordingly, it is desirable to provide methods, systems, and media for generating contextually relevant messages.

SUMMARY

In accordance with various embodiments of the disclosed subject matter, methods, systems, and media for generating contextually relevant messages are provided.

In accordance with some embodiments of the disclosed subject matter, a method for generating contextually relevant messages is provided, the method comprising: requesting, using a hardware processor of a user device, content from a content source, wherein the user device is associated with a user; receiving a content item responsive to the request; causing the received content item to be presented using a display device coupled to the hardware processor; causing an endorsement indication that includes endorsement information and identity information corresponding to an endorsing user to be concurrently presented with the content item, wherein the user and the endorsing user are social connections; receiving user input selecting at least a portion of the endorsement indication; causing a temporary messaging interface including a temporary message from the user to the endorsing user to be presented, wherein the temporary message includes the content item; receiving user input in connection with the temporary messaging interface; causing a permanent message to be created based on the temporary message and the user input received in connection with the temporary messaging interface; and causing the permanent message to be presented to the endorsing user.

In accordance with some embodiments of the disclosed subject matter, a system for generating contextually relevant messages is provided, the system comprising: a hardware processor that is programmed to: request content from a content source, wherein the user device is associated with a user; receive a content item responsive to the request; cause the received content item to be presented using a display device coupled to the hardware processor; cause an endorsement indication that includes endorsement information and identity information corresponding to an endorsing user to be concurrently presented with the content item, wherein the user and the endorsing user are social connections; receive user input selecting at least a portion of the endorsement indication; cause a temporary messaging interface including a temporary message from the user to the endorsing user to be presented, wherein the temporary message includes the content item; receive user input in connection with the temporary messaging interface; cause a permanent message to be created based on the temporary message and the user input received in connection with the temporary messaging interface; and cause the permanent message to be presented to the endorsing user.

In accordance with some embodiments of the disclosed subject matter, a non-transitory computer-readable medium containing computer executable instructions that, when executed by a processor, cause the processor to perform a method for generating contextually relevant messages is provided, the method comprising: requesting content from a content source, wherein the user device is associated with a user; receiving a content item responsive to the request; causing the received content item to be presented using a display device; causing an endorsement indication that includes endorsement information and identity information corresponding to an endorsing user to be concurrently presented with the content item, wherein the user and the endorsing user are social connections; receiving user input selecting at least a portion of the endorsement indication; causing a temporary messaging interface including a temporary message from the user to the endorsing user to be presented, wherein the temporary message includes the content item; receiving user input in connection with the temporary messaging interface; causing a permanent message to be created based on the temporary message and the user input received in connection with the temporary messaging interface; and causing the permanent message to be presented to the endorsing user.

In accordance with some embodiments of the disclosed subject matter, a system for generating contextually relevant messages is provided, the system comprising: means for requesting content from a content source, wherein the user device is associated with a user; means for receiving a content item responsive to the request; means for causing the received content item to be presented using a means for displaying; means for causing an endorsement indication that includes endorsement information and identity information corresponding to an endorsing user to be concurrently presented with the content item, wherein the user and the endorsing user are social connections; means for receiving user input selecting at least a portion of the endorsement indication; means for causing a temporary messaging interface including a temporary message from the user to the endorsing user to be presented, wherein the temporary message includes the content item; means for receiving user input in connection with the temporary messaging interface; means for causing a permanent message to be created based on the temporary message and the user input received in connection with the temporary messaging interface; and means for causing the permanent message to be presented to the endorsing user.

In some embodiments, the content item includes video content.

In some embodiments, the system further comprises means for causing the video content to be played back concurrently with presenting the temporary messaging interface.

In some embodiments, the system further comprises: means for determining that the user input received in connection with the temporary messaging interface is insufficient to cause the permanent message to be created; and means for causing presentation of the temporary messaging interface to be inhibited in response to determining that the user input received in connection with the temporary messaging interface is insufficient.

In some embodiments, the system further comprises: means for causing the temporary message to be saved upon causing presentation of the temporary messaging interface to be inhibited; and means for causing the content item to be presented at a subsequent time using the display device; and means for causing the saved temporary message to be presented in the temporary message interface in response to causing the content item to be presented at the subsequent time.

In some embodiments, the permanent message includes the content item and the endorsement information.

In some embodiments, the user input received in connection with the temporary messaging interface includes user input to add text to the temporary message.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and/or media) for generating contextually relevant messages are provided.

In some embodiments, the mechanisms described herein can receive a request for one or more content items, such as videos, social network posts, microblog posts, and/or any other suitable content items. In some embodiments, these content items can be associated with endorsements of the content by users that were presented with the content item. Such endorsements can include, for example, an indication that the user endorsing the content item enjoyed the content item or did not enjoy the content item. As another example, such endorsements can include sharing the content item with other users (e.g., social connections), posting a comment in connection with the content, and/or any other suitable act of providing feedback about the content item. In a more particular example, a user presented with a feed of videos from a video sharing service can be presented with endorsements of the videos provided by social connections of the user, such as an indication that a particular social connection "liked" or shared a video in the feed.

In some embodiments, the mechanisms described herein can cause public endorsements provided by a user to be presented to at least social connections of the user when a social connection is presented with the associated content item. In some embodiments, a particular endorsement and/or user information identifying a user associated with the endorsement can be selectable in a user interface being used to present the content item associated with the endorsement. In response to such a selection, the mechanisms described herein can cause a draft message including the content item and information about the endorsement to be presented to a user, in some embodiments. Additionally, in some embodiments, the mechanisms described herein can receive input indicating one or more actions to perform in connection with the draft message, and can cause a message based on the draft message to be sent to the user associated with the endorsement. In a more particular example, a selection of a particular endorsement and/or user information associated with the endorsement can be received by the mechanisms described herein indicating that a user selected an avatar of a social connection that "liked" a particular video. In such an example, in response to such a selection, the mechanisms described herein can cause a draft message including the video, information indicating that the social connection liked the video, and information indicating when the social connection liked the video to be presented to the user that made the selection.

Figure 1:
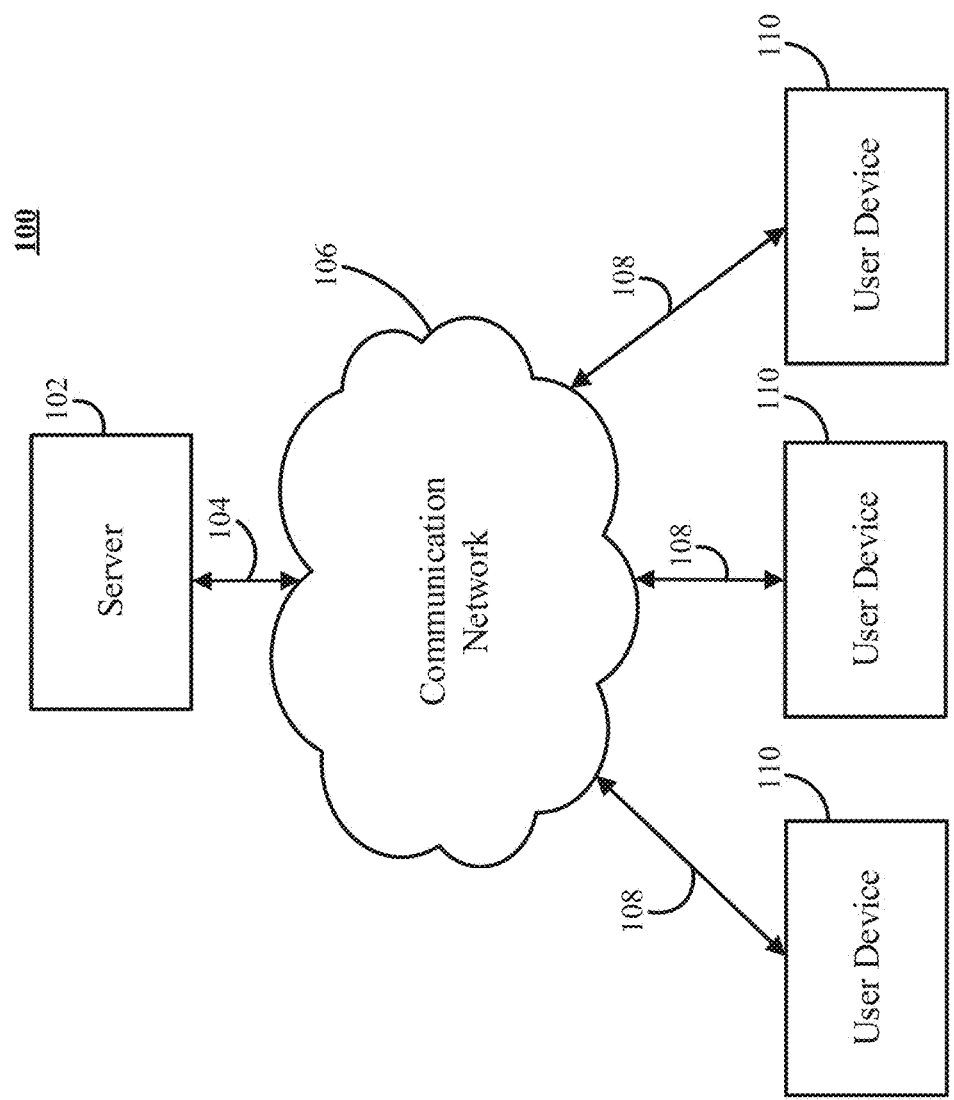
FIG. 1 shows an example of a generalized schematic diagram of a system on which the mechanisms for generating contextually relevant messages as described herein can be implemented in accordance with some embodiments of the disclosed subject matter.

FIG. 1 shows an example 100 of a generalized schematic diagram of a system on which the mechanisms for generating contextually relevant messages as described herein can be implemented in accordance with some embodiments of the disclosed subject matter. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for generating contextually relevant messages, such as a processor, a computer, a data processing device, or any suitable combination of such devices. For example, the mechanisms for generating contextually relevant messages can be distributed into multiple backend components and multiple frontend components and/or user interfaces. In a more particular example, backend components, such as mechanisms for receiving requests for one or more content items, determining social connections of a user and/or whether those social connections have performed a public endorsement in connection with a particular content item, providing access to content items, etc., can be performed on one or more servers 102. In another particular example, frontend components, such as presentation of a user interface, initiating requests for content items, selecting a social connection associated with a content item, initiating an endorsement in connection with a content item, entering user input, etc., can be performed on one or more user devices 110.

In some embodiments, each of user devices 110, and server 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a personal computer, a laptop computer, a smartphone, a tablet computer, a mobile telephone, a wearable computer, a digital media receiver, a set-top box, a smart television, a home entertainment system, a game console, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110 and server 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for generating contextually relevant messages. For example, system 100 can include a content discovery server 102 that facilitates discovery of content available from a content platform using the mechanisms described herein, a content delivery server 102 that responds to requests for the content by causing the requested content to be transmitted to user device 110 that requested the content, a social connection server 102 that stores information related to which users are connected and/or which users have performed public and/or private endorsements in connection with certain content items, and/or any other suitable servers for performing any suitable functions of the mechanisms described herein and/or any other suitable functions.

Figure 2:
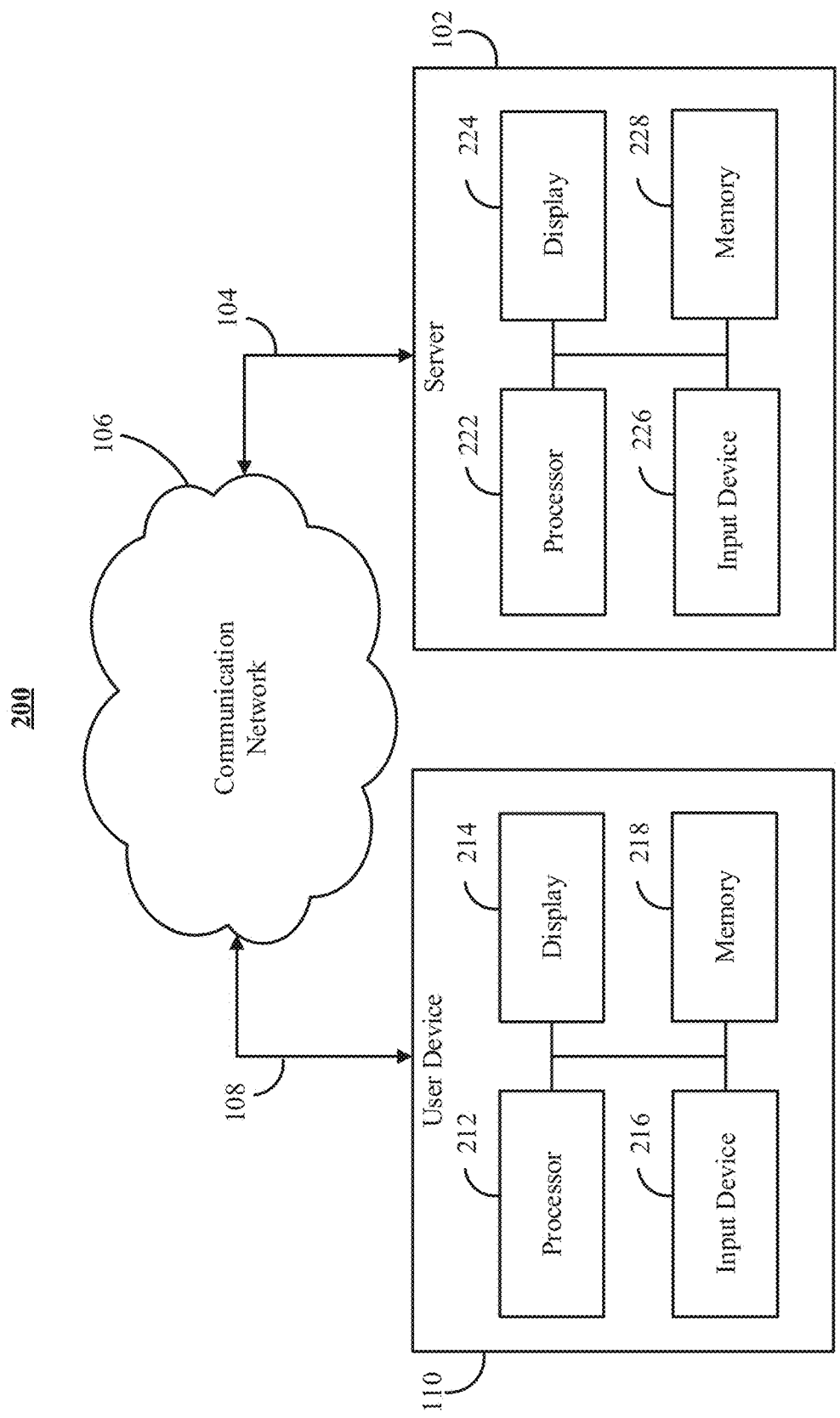
FIG. 2 shows an example of hardware that can be used to implement one or more user devices and servers depicted in FIG. 1 in accordance with some embodiments of the disclosed subject matter.

FIG. 2 shows an example 200 of hardware that can be used to implement one or more of user devices 110, and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for initiating requests for content, initiating endorsements in connection with received content, presenting a user interface for composing a message to a social connection, to send and receive data through communications link 108, and/or for performing any other suitable task associated with the mechanisms described herein. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device.

Server 102 can include a hardware processor 222, a display 224, an input device 226, and memory 228, which can be interconnected. In some embodiments, memory 228 can include a storage device (such as a non-transitory computer-readable medium) for storing data received through communications link 104 or through other links. The storage device can further include a server program for controlling hardware processor 222. In some embodiments, memory 228 can include information stored as a result of user activity (e.g., sharing content, requests for content, etc.), and hardware processor 222 can receive requests for content from user devices 110 and transmit instructions for causing the content to be presented by user device 110 in association with information indicating public endorsements provided by social connections of a user of user device 110 in connection with the content that is caused to be presented (e.g., as described below in connection with process 300 of FIG. 3). In some embodiments, the server program can cause hardware processor 222 to, for example, execute one or more portions of process 300 as described below in connection with FIG. 3.

Hardware processor 222 can use the server program to communicate with user devices 110 as well as provide access to and/or copies of mechanisms described herein. It should also be noted that data received through communications link 104 or any other communications links can be received from any suitable source. In some embodiments, hardware processor 222 can send and receive data through communications link 104 or any other communication links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for generating contextually relevant messages. Display 124 can include a touchscreen, a flat panel display, a cathode ray tube display, a projector, a speaker or speakers, and/or any other suitable display and/or presentation devices. Input device 126 can be a computer keyboard, a computer mouse, a touchpad, a voice recognition circuit, a touchscreen, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Figure 3:
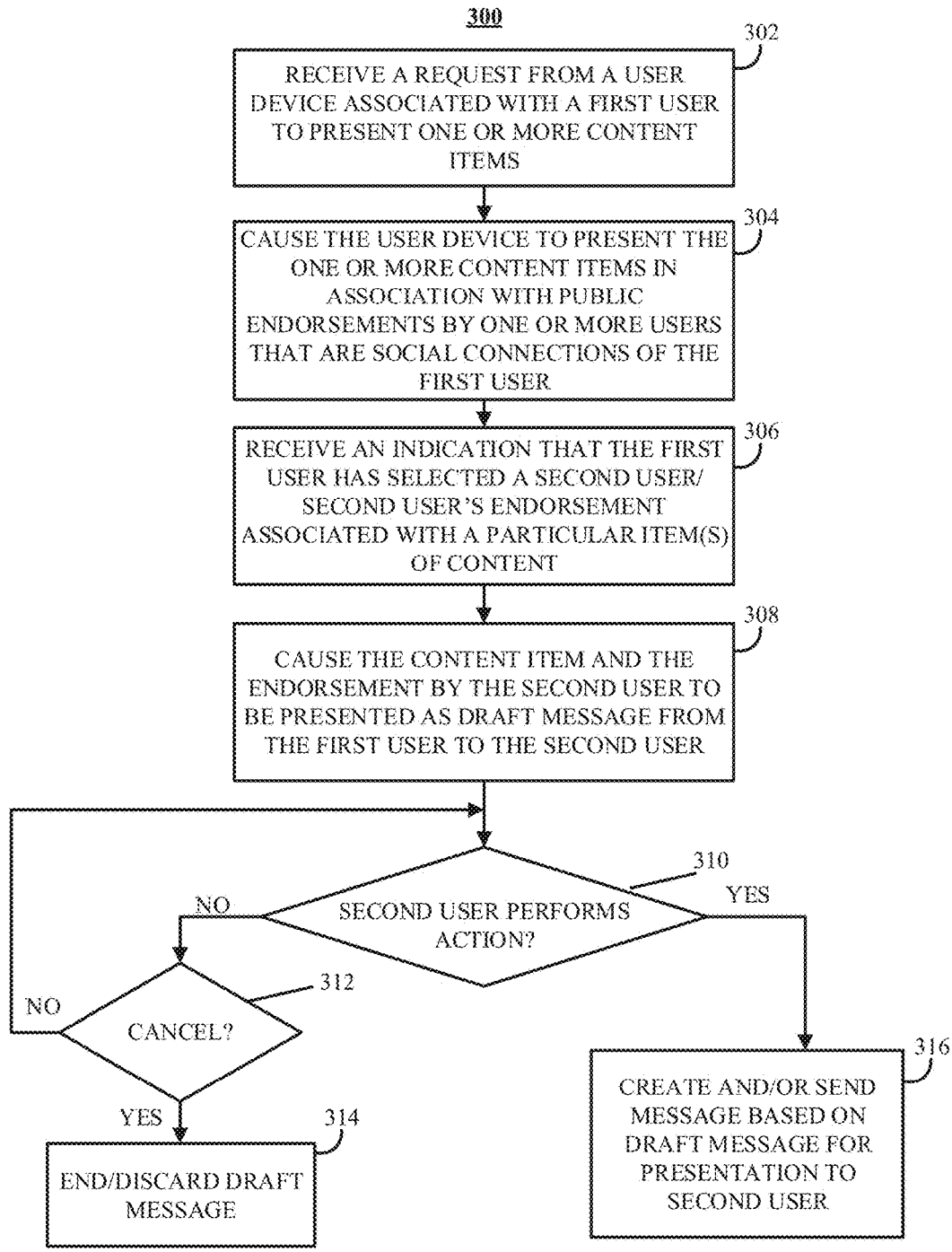
FIG. 3 shows an example of a process for generating contextually relevant messages in accordance with some embodiments of the disclosed subject matter.

Turning to FIG. 3, an example of a process 300 for generating contextually relevant messages is shown in accordance with some embodiments of the disclosed subject matter. At 302, process 300 can receive a request from a user device associated with a first user to present on or more content items. In some embodiments, a user device (e.g., user device 110) can be associated with a user in any suitable fashion. For example, a username and password associated with the user can be submitted from the user device. As another example, a device identification associated with the user can be associated with the user device. As yet another example, biometric information associated with the user can be submitted using the user device.

In some embodiments, a content item requested by the user device can include any suitable content and can be associated with any suitable content source. For example, a content item can include media content such as video content, audio content, a text item (e.g., a blog post, a link to a web page and/or a portion of a web page, a news story, etc.), etc., and/or any suitable combination of media content. As another example, a content item can include user generated content, such as a social media post, a micro-blog post, etc., created by a social connection of the first user (and/or any other suitable user). As yet another example, a content item can include user generated content that includes media content from another source (e.g., as embedded content, as a link to the media content, etc.).

In some embodiments, the request received at 302 can include a request for one or more particular content items (e.g., as a request for a web page and/or content corresponding to the one or more content items). For example, the request can include a uniform resource locator (URL) corresponding to a particular content item or content items. As another example, the request can include one or more identifiers for a particular content item or content items.

Additionally or alternatively, in some embodiments, the request can be a request for one or more content items that satisfy one or more criteria associated with the request. For example, the request can be a search query associated with one or more keywords (and/or any other suitable criteria) associated with the search query. As another example, the request can be a request for a feed of relevant content items (e.g., a feed of content items from social connections of a user). In such an example, the feed of content items can be selected by a provider of the feed (e.g., a social networking service, a content provider, etc.) using any suitable technique or combination of techniques. In a more particular example, the feed of content items can be selected by the provider of the feed based on relevance to the user associated with the user device submitting the request. In another more particular example, the feed of content items can be selected by the provider of the feed based on times associated with the content items (e.g., the feed can be ordered chronologically). Such a selection can be performed prior to the request being received (e.g., the service provider can periodically select one or more content items to include in a feed) and/or at the time when the request is received.

At 304, process 300 can cause the user device to present the one or more requested content items in association with public endorsements of the one or more content items by one or more social connections of the first user. In some embodiments, an endorsement can be based on any suitable interaction with a content item by a user. For example, an endorsement can be based on user input indicating that the user enjoyed and/or approves of the content. In such an example, such input can be provided by selecting a user interface element for "liking" the content item, selecting a user interface element for giving the content item a "thumbs up," selecting a user interface element with another positive indicator (e.g., an upward pointing arrow, a plus sign, etc.).

As another example, an endorsement can be based on user input indicating that the user did not enjoy and/or disapproves of the content. In such an example, such input can be provided by selecting a user interface element for "disliking" the content item, selecting a user interface element for giving the content item a "thumbs down," selecting a user interface element with another negative indicator (e.g., a downward pointing arrow, a minus sign, etc.).

As yet another example, an endorsement can be based on a user sharing the content item with other users (e.g., social connections) using any suitable technique or combination of techniques to share the content item, such as through one or more social networks with which the user is affiliated (e.g., as a user of the social network), through a message to one or more other users (e.g., email, SMS messages, chat, etc.), through a blogging or microblogging service, through a content and/or news aggregator, etc.

As still another example, an endorsement can be based on a comment submitted in association with the content item. In such an example, such a comment can be submitted in a comments section associated with the content item, in a comment section associated with a shared version of the content item, and/or using any other suitable comment section.

In some embodiments, a public endorsement can be an endorsement that is visible to at least social connections of a user that provided the endorsement and in association with identifying information of the user that provided the endorsement (e.g., a username of the endorsing user, an avatar of the endorsing user, etc.). For example, a public endorsement can be an endorsement that is not generally visible to all users of a platform that is used to provide the endorsement, but instead is visible to users that are social connections of the endorsing user and/or have been placed into a particular group by the endorsing user and to which the endorsing user has made the endorsement visible.

In some embodiments, a social connection of a first user can be any second user that is connected to the first user using any suitable technique or combination of techniques. For example, the first user can be connected to another user by a messaging platform such as email, instant messaging, text messaging (e.g., SMS messaging, MMS messaging, etc.), private messaging through a social network (e.g., a private message from one user of a social network to another user of the social network), public messaging through a social network (e.g., a message from one user of a social network that is directed at another user of a social network and that is viewable by at least a portion of other users of the social network), and/or through any other suitable messaging platform. In some embodiments, two users can be considered social connections when each user has communicated with the other user through a messaging platform at least a threshold number of times such that there is two-way communication.

As another example, the first user can be connected to another user by a direct social connection, such as: by the first user being a "friend," a "connection," etc., of another user on a social network; by the first user following or subscribing to another user on a social network and/or a content hosting platform (e.g., a video sharing service); by the first user requesting content associated with the sharing user directly (e.g., by going to the sharing user's web page, blog, microblog, social aggregation platform, social network page, using an RSS feed, etc.). In some embodiments, a first user that is a social connection of another user can be presented with content shared by the other user as part of a feed of content, can be notified about new content shared by the other user (e.g., by email, text message, mobile notification, etc.), and/or can be presented with the shared content using any other suitable technique or combination of techniques.

In some embodiments, each endorsement provided by a user in connection with a content item can be recorded (e.g., in a database). Additionally, in some embodiments, each endorsement provided by the user can be associated with an indication of whether the endorsement is a public endorsement, a private endorsement, limited to a particular group or groups of social connections, etc.

In some embodiments, in association with causing a user device to present content items, process 300 (and/or any other suitable process) can determine if there are endorsements of the content item provided by social connections of a user associated with the user device. In cases in which there are such endorsement of the content item (and the endorsements are visible to the user, e.g., as public endorsements), process 300 (and/or any other suitable process) can cause at least a portion of the endorsements to be presented in connection with the content item. For example, if a social connection has "liked" a particular content item, process 300 (and/or any other suitable process) can cause identifying information of the user to be presented in connection with the content item along with an indication that the user "liked" the content item.

In some embodiments, the content item and/or any associated endorsements by social connections (and/or any other suitable content such as a comments section) can be presented by the user device using any suitable user interface. Such a user interface can facilitate presentation of the one or more content items and associated public endorsements by social connections of the user. Additionally, as described below in connection with 306, process 300 can facilitate selection of one or more social connections and/or public endorsements by a user of the user device.

At 306, process 300 can receive an indication that the first user has selected user identifying information of a social connection associated with a particular content item and/or a public endorsement by the social connection associated with a particular content item. In some embodiments, the indication that is received can be formatted and/or received using any suitable technique or combination of techniques. For example, the indication can be received as a request for content corresponding to a URL associated with the selected identifying information of the social connection and/or public endorsement. In such an example, the identifying information of the social connection and/or the endorsement can be associated with a URL that, when selected, causes a user interface for messaging that social connection to be presented (e.g., as described below in connection with 308). As another example, the indication can be received as information identifying which social connection and/or which endorsement by that social connection was selected.

At 308, process 300 can cause the particular content item and information about the public endorsement by the social connection to be presented by the user device as a draft message from the first user to the social connection. In some embodiments, such a draft message can be created as a new message between the first user and the social connection. For example, a new thread can be created in response to the selection at 306.

Additionally or alternatively, in some embodiments, such a draft message can be added to an existing thread of messages between the first user and the social connection. For example, if a thread already exists between the first user and the social connection, process 300 can add the draft message to the existing thread between the first user and the social connection. In a more particular example, the draft message can be added to the end of the existing thread.

In some embodiments, the draft message can be a message to be sent using any suitable messaging platform and/or platforms. For example, the draft message can be a message to be sent using a messaging function that is provided as part of the service that is providing the content item (e.g., a messaging function of a social networking service, of a content sharing service, etc.). As another example, the draft message can be a message to be sent using a messaging function that is provided as part of the service that is being used to view the content item (e.g., a messaging function of a social networking service to which the content item was shared, of a content aggregation service to which the content was shared from another source, etc.).

As yet another example, the draft message can be a message to be sent using a messaging function associated with a different application and/or service than the application and/or service that is being used to view the content item. In a more particular example, such a different application and/or service can be used to create the message to be sent as an email, an instant message (e.g., a chat message), a text message (e.g., sent using SMS techniques, MSM techniques, etc.), etc.

In some embodiments, the draft message can be a message that is directed to the social connection which will not be shared with other users and/or social connections. For example, the draft message can be a message that is private between the first user and the social connection. Alternatively, in some embodiments, the draft message can be directed at the social connection but shared with other users (e.g., social connections of the social connection and/or the first user). In some embodiments, the first user can be presented with one or more user interface elements that can be used to control whether the draft message is a public message or a private message.

In some embodiments, the draft message can be associated with one or more user interface elements that can be used to provide one or more endorsements (e.g., "liking" the content item, sharing the content item, subscribing to a creator of the content item, etc.) in connection with an content item included in the draft message and/or to add content (e.g., text, emoji, images, etc.) to the draft message.

At 310, process 300 can determine whether the first user performed an action associated with the draft message presented at 308. In some embodiments, an action can include any suitable endorsement (e.g., such as providing an endorsement for the content item such as by "liking" the content item, sharing the content item, subscribing to a creator of the content item, etc.) provided by the first user in connection with the content item in the draft message. Additionally, in some embodiments, actions can include adding text to the draft message in connection with the content item.

In some embodiments, actions associated with the draft message can include selecting a user interface element indicating that the draft message is to be sent to the social connection as a message. For example, the draft message can be presented with a user interface element for indicating that the first user is "done" editing the message. As another example, the draft message can be presented with a user interface element for indicating that the draft message is to be "sent." As yet another example, the draft message can be presented with a user interface element for indicating that the draft message is to be "submitted." As still another example, any other suitable user interface element for causing the draft message to be used to generate and/or create a message for the social connection can be provided, and/or any suitable combination of user interface elements for causing the draft message to be used to generate and/or create a message for the social connection can be provided.

If process 300 determines that a suitable user action or actions have not been performed by the first user ("NO" at 310), process 300 can move to 312 and determine whether the user has indicated that the message be cancelled or otherwise not sent to the social connection selected at 306. In some embodiments, the first user can provide any suitable input to indicate that the draft message is not to be sent and/or is to be discarded. For example, the user can select a "cancel" user interface element. As another example, the user can select an area of a user interface that does not correspond to the user interface for composing the draft message (e.g., in cases in which the user interface for composing the draft message is presented as an overlay of another user interface) to cancel or otherwise discard the draft message. As yet another example, the user can cancel or otherwise discard the draft message by navigating away from a web page that was being used to compose the draft message and/or by navigating away from an application that was being used to compose the draft message.

At 312, process 300 can determine whether the user has cancelled the draft message. If process 300 determines that the user has not cancelled the draft message ("NO" at 312), process 300 can return to 310 to continue determining whether the user has performed an action. Otherwise, if process 300 determines that the user has cancelled the draft message ("YES" at 312), process 300 can end and/or the draft message can be discarded at 314. In some embodiments, the draft message can be saved at 314 in lieu of being discarded (e.g., automatically or in response to user input indicating that the draft message is to be saved). In such embodiments, the draft message can be presented when a user device associated with the first user requests and/or loads the content item associated with the draft message.

Returning to 310, if process 300 determines that the user has performed a suitable action ("YES" at 310), process 300 can move to 316 and can create and/or send a message based on the draft message for presentation to the social connection selected at 308. Note that a suitable action that causes the message to be created and/or sent can include any suitable action, which can be designated by a service provider, a user, and/or any other suitable entity. In some embodiments, process 300 can require that a text (or other input, such as emoji, an image, etc.) be provided before allowing the message to be created and/or sent.

In some embodiments, the message can be sent to the social connection using any suitable technique or combination of techniques. For example, the message can be made available for retrieval by a user device associated with the social connection. In a more particular example, if the message is an email, the message can be sent to an email address associated with the social connection. The user device associated with the social connection can then retrieve the message using, for example, an email client application or an email web client.

As another example, the message can be pushed to a user device associated with the social connection. In a more particular example, if the message is a text message, the message can be sent using techniques that cause the user device (or user devices) to which the message is being sent to receive the message if the user device is connected to a network used to send the message (e.g., a cellular or other mobile network, the Internet, etc.), without the user device requesting that the message be sent.

As yet another example, the message can be made available for retrieval by a user device associated with the social connection, and a notification message can be communicated to the social connection using any suitable user device associated with the social connection. For example, a push notification can be sent to a user device associated with the social connection, informing the social connection that the message is awaiting the social connection. Such a push notification can, in some embodiments, be configured such that selection of the notification and/or selection of a hyperlink in the notification can cause the message to be presented by the user device using any suitable application.

In some embodiments, the message can be created and made available by the social connection using any suitable device, without informing the user that the message is available for retrieval. For example, the message can be available through a social network service messaging function, and the user may not be notified of the availability of the message until the user selects to view messages associated with the social networking service.

Figure 4:
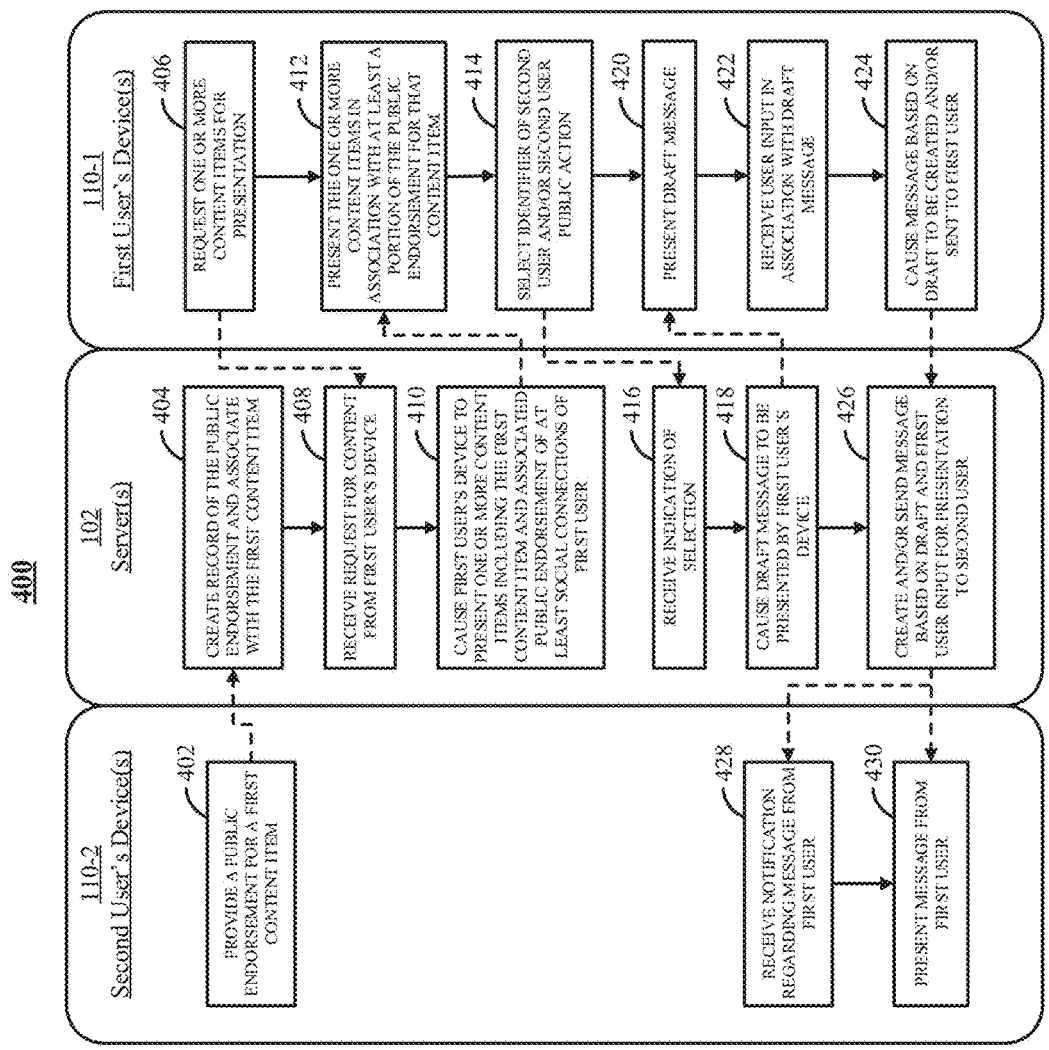
FIG. 4 shows an example of a data flow that can be used in conjunction with the processes described above in connection with FIG. 3 in accordance with some embodiments of the disclosed subject matter.

FIG. 4 shows an example 400 of a data flow that can be used in conjunction with the processes described above in connection with FIG. 3 in accordance with some embodiments of the disclosed subject matter. At 402, a second user's user device 110-2 associated with a second user (e.g., the social connection of the first user as described above in connection with process 300 of FIG. 3) can endorse a first content item. As described above, the first content item can be any suitable content item such as: a video available from a video sharing service; a post on a social network, blog, microblog, etc.; a news story; any other suitable content item; and/or any suitable combination of content items.

At 404, server 102 can create a record of the public endorsement and can associate the public endorsement with the first content item. In some embodiments, the record created at 404 can be any suitable record and can be stored using any suitable device, which can be the server executing at least a portion of process 300 described above in connection with FIG. 3, or a different server that makes such records available. For example, the record can be stored in a database of such records (and any other suitable information) maintained by a server, which can be organized using any suitable technique or combination of techniques for organizing a database of information.

At 406, a first user device 110-1 associated with a first user (e.g., the user associated with the user device requesting content as described above in connection with 302 of FIG. 3) can request one or more content items for presentation. In some embodiments, the request can be received using any suitable technique or combination of techniques and can be initiated at a user device using any suitable technique or combination of techniques. For example, one or more techniques described above in connection with 302 can be used to initiate and/or receive the request at 406.

At 408, server 102 can receive the request for content from the first user's device and can, in some embodiments, identify which content is to be presented to the user (e.g., when the request is not a request for a particular content item, as described above in connection with 304 of FIG. 3).

At 410, server 102 can cause user device 110-1 to present one or more content items including the first content item (i.e., the content item associated with the public endorsement provided at 402). Additionally, in some embodiments, server 102 can cause public endorsement associated with one or more social connections of the first user to be presented based on records of public endorsements (e.g., as described above in connection with 404) and information identifying the social connections of the first user.

At 412, user device 110-1 can present the one or more content items in association with at least a portion of the public endorsements of the one or more content items provided by a social connection. In some embodiments, the one or more content items and public endorsements can be presented using any suitable user interface.

At 414, user device 110-1 can receive a selection (e.g., based on user input) of an identifier of a social connection and/or an endorsement by that social connection. In some embodiments, user device 110-1 can communicate an indication of this selection to server 102.

At 416, server 102 can receive an indication of a user and/or user endorsement that has been selected at user device 110-1. Such an indication can be received using any suitable technique or combination of techniques, and can be received in any suitable format.

At 418, server 102 can cause a draft message to be presented by user device 110-1, which can include the content item (i.e., the first content item) corresponding to the public endorsement and/or identifying information of the social connection selected at 414, along with an indication of what the public endorsement was and, in some embodiments, when the second user performed the endorsement. Inclusion of this information in the draft message (which can be sent and/or created for the second user at the discretion of the first user) can, for example, provide context to any endorsement performed by the first user in connection with the content item.

At 420, user device 110-1 can present the draft message for review and/or input from a user of user device 110-1. As described above in connection with 308 of FIG. 3, the draft message can be presented using any suitable user interface having any suitable user interface elements. Although the draft message is described herein as being caused to be presented by server 102, such causing can be performed using any suitable technique or combination of techniques. For example, the message can be presented based on instructions sent to user device 110-1 at any suitable time. In a more particular example, in cases where the one or more content items are presented in a web page, the instructions for presenting the web page can include instructions for creating the draft message for presentation to the user of user device 110-1. In another more particular example, in cases where the one or more content items are presented using an application for presenting such content items, the application can include instructions creating the draft message for presentation to the user of user device 110-1. In such particular examples, such instructions can be communicated to user device 110-1 prior to the user selecting any second user and/or second user endorsement at 414, and can be executed by user device 110-1 in response to such a selection without further instructions from server 102. Alternatively, server 102 can receive the indication of the selection and can cause instructions for creating the draft message to user device 110-1 in response to receiving the indication.

At 422, user device 110-1 can receive user input in associated with the draft message. In some embodiments, such user input can take any suitable form. For example, the user input include user input to add text to the message (e.g., using a text editor user interface). As another example, the user input can be user input to perform an endorsement in connection with the content item, such as "liking" the content item, subscribing to a creator of the content item, sharing the content item, etc.

At 424, user device 110-1 can cause a message based on the draft message to be created and/or sent to the first user in response to any suitable user action. As described above in connection with 310, the user action to cause the draft message to be created and/or sent can include any suitable user action, such as selecting a "send" user interface element, providing an "enter" keyboard input, etc.

At 426, server 102 can create and/or send the message based on the draft message and any user input received by user device 110-1 at 422 for presentation to the first user. In some embodiments, the message based on the draft message can be created using any suitable technique or combination of techniques. For example, the message can be created as instructions that, when executed by an application installed on a user device, cause the message to be presented by the user device. In such an example, the content of the message can be stored entirely on a server until the instructions are executed by the user device. Such instructions can be communicated to the user device that is to present the message and can be used to present the message. As another example, at least a portion of the message can be created as content that is communicated to a user device. In such an example, at least a portion of the message can be presented by the user device without that portion being stored at a server after the message has been delivered to the user device.

At 428, user device 110-2 can receive a notification regarding the message from the first user. In some embodiments, the notification can be sent using any suitable technique or combination of techniques, such as using push notifications, email, text messages, an icon associated with a web page or application of a service used to send the message, etc.

At 430, user device 110-2 can present the message from the first user. In some embodiments, any suitable user interface can be used to present the message. Note that, in some embodiments, the message can be presented at 430 regardless of whether a notification was sent and/or was received at 428.

In some embodiments, the message from the first user can be presented if user device 110-2 (and/or any other suitable device associated with the second user) is used to present the first content item (e.g., in a user interface for presenting one or more content items). For example, if user device 110-2 loads a web page that includes the first content item, the message from the first user can be presented in association with the first content item. In such an example, a user interface for receiving user input in connection with the message from the first user (e.g., for the second user to respond to the message) can be presented in association with the message from the first user. As another example, if user device 110-2 loads a user interface for presenting the first content item using an application for accessing content from the content source (and/or from any other suitable content source), the message from the first user can be presented in association with the first content item. Additionally or alternatively, in some embodiments, an indication that the message exists and/or that the message has not been read and/or reviewed by the second user can be presented in association with the first content item if user device 110-2 (and/or any other suitable device associated with the second user) is used to present the first content item (e.g., in a user interface for presenting one or more content items). In some embodiments, such an indication can be selectable to cause a user interface for presenting the message from the first user to be presented.

Similarly, in some embodiments, the message from the first user and/or any response from the second user can be presented to if user device 110-1 (and/or any other suitable device associated with the second user) is used to present the first content item in a user interface for presenting the first content item (e.g., in a user interface for presenting one or more content items). For example, if user device 110-1 loads a web page that includes the first content item, the message from the first user and/or any responsive message from the second user can be presented in association with the first content item. In such an example, a user interface for receiving user input in connection with the message from the first user and/or a response from the second user (e.g., for the first user to continue a conversation with the second user) can be presented in association with the first content item. As another example, if user device 110-1 loads a user interface for presenting the first content item using an application for accessing content from the content source (and/or from any other suitable content source), the message from the first user and/or a response from the second user can be presented in association with the first content item. Additionally or alternatively, in some embodiments, an indication that the message exists, that a response to the message has been received, and/or that the message has not been read and/or reviewed by the second user can be presented in association with the first content item if user device 110-1 (and/or any other suitable device associated with the first user) is used to present the first content item (e.g., in a user interface for presenting one or more content items). In some embodiments, such an indication can be selectable to cause a user interface for presenting the message from the first user and/or a response from the second user to be presented.

Figure 5A:
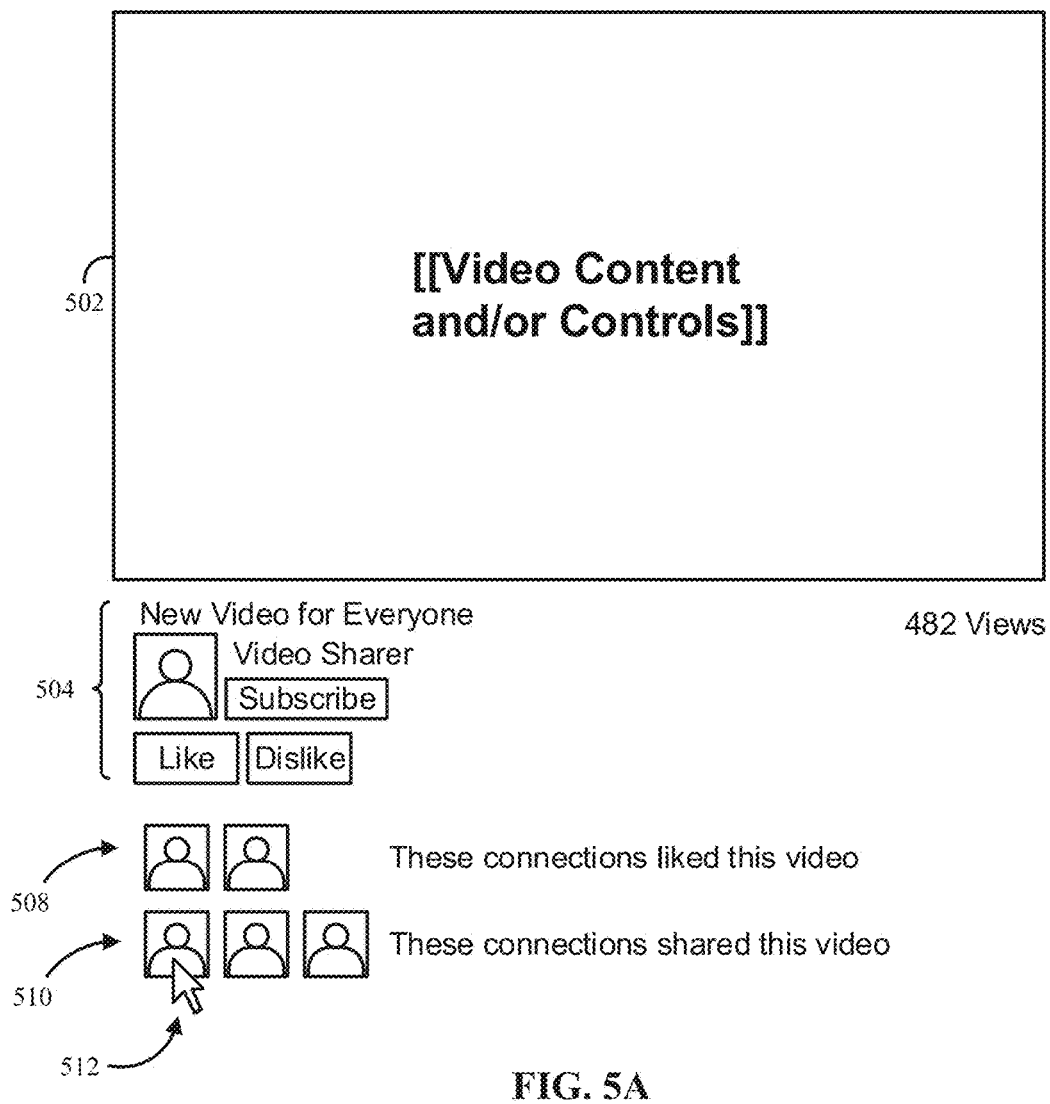
FIGS. 5A and 5B show examples of user interfaces for presenting a content item in association with endorsements by social connections of a user and presenting a draft message about the content item in accordance with some embodiments of the disclosed subject matter.

FIG. 5A shows an example 500 of a user interface for presenting a content item in association with endorsements provided by social connections of a user in accordance with some embodiments of the disclosed subject matter. As shown in FIG. 5A, user interface 500 can include a content item 502 and associated descriptive information and/or user interface elements 504 for initiating endorsements in connection with content item 502. In some embodiments, information and/or elements 504 can include information identifying a title of content item 502, identifying information of a creator of content item 502, an image and/or avatar associated with a creator of content item 502, etc., as well as user interface elements for "liking" or "disliking" content item 502, subscribing to content from the creator of content item 502, and/or any other suitable user interface elements.

In some embodiments, user interface 500 can include information indicating that one or more social connections 508 of a user viewing user interface 500 (e.g., the user viewing the user interface can be determined based on a username and password provided) "liked" content item 502. Social connections 508 can be identified by images and/or avatars associated with social connections 508, by usernames, real names, etc. Additionally, user interface 500 can include information indicating an endorsement of content item 502 provided by social connections 508 (e.g., information indicating that social connections 508 publicly "liked" content item 502).

In some embodiments, user interface 500 can include information indicating that one or more social connections 510 of a user viewing user interface 500 (e.g., the user viewing the user interface can be determined based on a username and password provided) "shared" content item 502. Social connections 510 can be identified by images and/or avatars associated with social connections 510, by usernames, real names, etc. Additionally, user interface 500 can include information indicating an endorsement that was performed by social connections 510 (e.g., information indicating that social connections 510 publicly shared content item 502).

In some embodiments, social connections 508 and social connections 510 can include the same or different social connections of the user based on whether the social connection performed both endorsements. Additionally, in some embodiments, a particular social connection can be included for one endorsement and not another if that social connection provided both endorsements. For example, a social connection that shared the content and "liked" the content can be presented as part of social connections 510 and not as part of social connections 508 if there are at least a threshold number of other social connections of the user that "liked" the content without also sharing the content. Note that although user interface 500 is shown as including groups of social connections associated with different endorsements, each social connection can be separately identified with one or more public endorsements that the social connection provided. Also note that although groups of social connections are shown as being associated with particular endorsements in connection with user interface 500, these are merely examples and any number of social connections can be included in a user interface in association with any suitable endorsement or endorsements provided by those social connections. A cursor 512 is shown in connection with user interface 500, such a cursor can indicate a user interface element that will be selected should a user provide input to cause a selection to be made (e.g., via a mouse, trackpad, etc.). Cursor 512 is merely shown as an example, and the mechanisms described herein can be used with any suitable user interface such as a touchscreen, voice commands, etc.

Figure 5B:
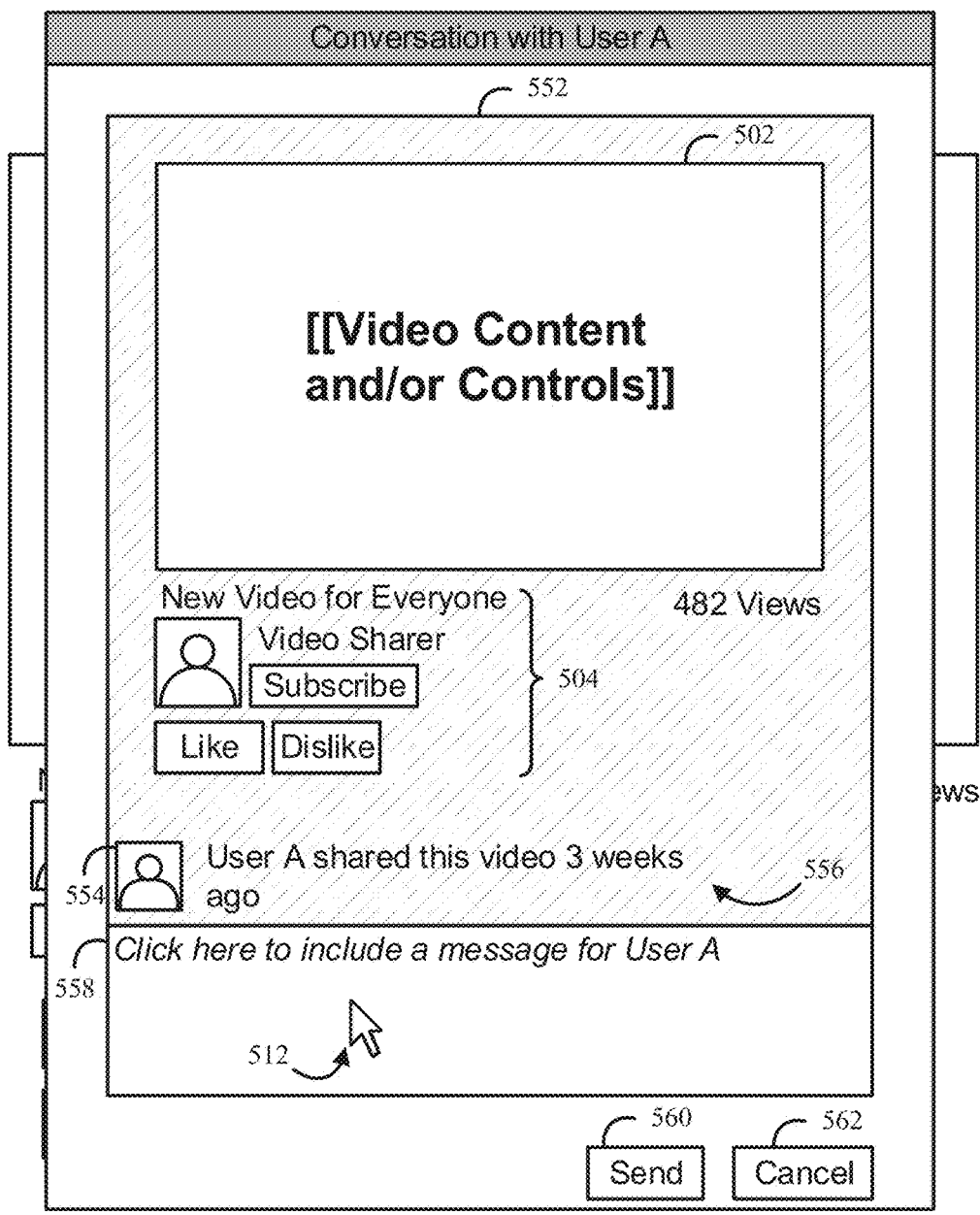

FIG. 5B shows an example 550 of a user interface for presenting a draft message to a social connection which includes the content item and information about an endorsement provided by the social connection in accordance with some embodiments of the disclosed subject matter. As shown in FIG. 5B, user interface 550 can include a draft message 552 which can include information associated with content item 502, such as associated descriptive information and/or user interface elements 504.

In some embodiments, draft message 552 can include identifying information 554 of a social connection that was selected from user interface 500. As described above, identifying information 554 can include images and/or avatars associated with the social connection, a username, a real name, etc. Additionally, in some embodiments, draft message 552 can include contextual information 556 that can include information indicating which endorsement or endorsements the social connection provided and a time or times when the endorsement or endorsements were provided.

In some embodiments, user interface 550 can include a text field 558 which can receive textual input to be included with draft message 552 when sent to the social connection associated with identifying information 554. Additionally, in some embodiments, user interface 550 can include user interface elements 560 and 562 for causing draft message 552 to be sent or cancelled, respectively.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 212 and/or hardware processor 222) to execute the mechanisms described herein. For instance, these mechanisms can encompass a computer program written in a programming language recognizable by user device 110, and/or server 102 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about endorsements stored on a user device 110, information about endorsements stored on a remote device such as server 102, etc.), or to control whether and/or how to information about user endorsements is disseminated to social connections of the user. In addition, certain data can be treated in one or more ways before it is stored or used, so that personal information is removed. For example, a user's identity can be treated so that no personal information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 3 and 4 can be executed or performed in any order or sequence not limited to the order and sequence shown and described in the figures. Also, some of the above steps of the processes of FIGS. 3 and 4 can be executed or performed substantially simultaneously where appropriate or in parallel to reduce latency and processing times. Furthermore, it should be noted that FIGS. 3 and 4 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for generating contextually relevant messages.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating contextually relevant messages, the method comprising:
   requesting, using a hardware processor of a user device, content from a content source, wherein the user device is associated with a user;
   receiving, using the hardware processor, a content item that has been endorsed by an endorsing user responsive to the request;
   determining, using the hardware processor, that endorsement information and identity information corresponding to the endorsing user is associated with the content item and determining that the user and the endorsing user are social connections;
   in response to the determination, causing, using the hardware processor, the received content item to be presented using a display device coupled to the hardware processor and causing an endorsement indication that includes the endorsement information and the identity information corresponding to the endorsing user to be concurrently presented with the content item;
   receiving, using the hardware processor, a first user input selecting at least a portion of the endorsement indication;
   in response to receiving the first user input selecting at least the portion of the endorsement indication, generating, using the hardware processor and without user input, a temporary messaging interface including a temporary message from the user to the endorsing user, wherein the temporary message includes the content item and the endorsement information and wherein the temporary message is positioned at a first position within an existing messaging thread between the user and the endorsing user;
   receiving, using the hardware processor, a second user input in connection with the temporary messaging interface;
   in response to receiving the second user input, transitioning, using the hardware processor, the temporary message to a permanent message by adding content to the temporary message that is based on the second user input and modifying a position of the message in the existing messaging thread between the user and endorsing user from the first position to a second position; and
   causing, using the hardware processor, the message to be presented to the endorsing user in the existing messaging thread.

2. The method of claim 1, wherein the content item includes video content.

3. The method of claim 2, further comprising causing the video content to be played back concurrently with presenting the temporary messaging interface.

4. The method of claim 1, further comprising:
   determining that the second user input received in connection with the temporary messaging interface is not a user input to cause the permanent message to be created; and
   causing presentation of the temporary messaging interface to be inhibited in response to determining that the user input received in connection with the temporary messaging interface is not a user input to cause the permanent message to be created.

5. The method of claim 4, further comprising:
causing the temporary message to be saved upon causing presentation of the temporary messaging interface to be inhibited; and
causing the content item to be presented at a subsequent time using the display device coupled to the hardware processor; and
causing the saved temporary message to be presented in the temporary message interface in response to causing the content item to be presented at the subsequent time.

6. The method of claim 1, wherein the permanent message includes the content item and the endorsement information.

7. The method of claim 1, wherein the user input received in connection with the temporary messaging interface includes user input to add text to the temporary message.

8. A system for generating contextually relevant messages, the system comprising:
a memory; and
a hardware processor that, when executing computer executable instructions stored in the memory, is programmed to:
request content from a content source, wherein the user device is associated with a user;
receive a content item that has been endorsed by an endorsing user responsive to the request;
determine that endorsement information and identity information corresponding to the endorsing user is associated with the content item and determining that the user and the endorsing user are social connections;
in response to the determination, cause the received content item to be presented using a display device coupled to the hardware processor and cause an endorsement indication that includes the endorsement information and the identity information corresponding to the endorsing user to be concurrently presented with the content item;
receive a first user input selecting at least a portion of the endorsement indication;
in response to receiving the first user input selecting at least the portion of the endorsement indication, generate without user input a temporary messaging interface including a temporary message from the user to the endorsing user, wherein the temporary message includes the content item and the endorsement information and wherein the temporary message is positioned at a first position within an existing messaging thread between the user and the endorsing user;
receive a second user input in connection with the temporary messaging interface;
in response to receiving the second user input, transition the temporary message to a permanent message by adding content to the temporary message that is based on the second user input and modifying a position of the message in the existing messaging thread between the user and endorsing user from the first position to a second position; and
cause the message to be presented to the endorsing user in the existing messaging thread.

9. The system of claim 8, wherein the content item includes video content.

10. The system of claim 9, wherein the hardware processor is further programmed to cause the video content to be played back concurrently with presenting the temporary messaging interface.

11. The system of claim 8, wherein the hardware processor is further programmed to:
determine that the second user input received in connection with the temporary messaging interface is not a user input to cause the permanent message to be created; and
cause presentation of the temporary messaging interface to be inhibited in response to determining that the user input received in connection with the temporary messaging interface is not a user input to cause the permanent message to be created.

12. The system of claim 11, wherein the hardware processor is further programmed to:
cause the temporary message to be saved upon causing presentation of the temporary messaging interface to be inhibited; and
cause the content item to be presented at a subsequent time using the display device coupled to the hardware processor; and
cause the saved temporary message to be presented in the temporary message interface in response to causing the content item to be presented at the subsequent time.

13. The system of claim 8, wherein the permanent message includes the content item and the endorsement information.

14. The system of claim 8, wherein the user input received in connection with the temporary messaging interface includes user input to add text to the temporary message.

15. A non-transitory computer-readable medium containing computer executable instructions that, when executed by a processor, cause the processor to perform a method for generating contextually relevant messages, the method comprising:
requesting content from a content source, wherein the user device is associated with a user;
receiving a content item that has been endorsed by an endorsing user responsive to the request;
determining that endorsement information and identity information corresponding to the endorsing user is associated with the content item and determining that the user and the endorsing user are social connections;
in response to the determination, causing the received content item to be presented using a display device coupled to the hardware processor and causing an endorsement indication that includes the endorsement information and the identity information corresponding to the endorsing user to be concurrently presented with the content item;
receiving a first user input selecting at least a portion of the endorsement indication;
in response to receiving the first user input selecting at least the portion of the endorsement indication, generating without user input a temporary messaging interface including a temporary message from the user to the endorsing user, wherein the temporary message includes the content item and the endorsement information and wherein the temporary message is positioned at a first position within an existing messaging thread between the user and the endorsing user;
receiving a second user input in connection with the temporary messaging interface;
in response to receiving the second user input, transitioning the temporary message to a permanent message by adding content to the temporary message that is based on the second user input and modifying a position of the message in the existing messaging thread between the user and endorsing user from the first position to a second position; and causing the message to be presented to the endorsing user in the existing messaging thread.

16. The non-transitory computer-readable medium of claim 15, wherein the content item includes video content.

17. The non-transitory computer-readable medium of claim 16, wherein the method further comprises causing the video content to be played back concurrently with presenting the temporary messaging interface.

18. The non-transitory computer-readable medium of claim 15, wherein the method further comprises:
   determining that the second user input received in connection with the temporary messaging interface is not a user input to cause the permanent message to be created; and
   causing presentation of the temporary messaging interface to be inhibited in response to determining that the user input received in connection with the temporary messaging interface is not a user input to cause the permanent message to be created.

19. The non-transitory computer-readable medium of claim 18, wherein the method further comprises:
   causing the temporary message to be saved upon causing presentation of the temporary messaging interface to be inhibited;
   causing the content item to be presented at a subsequent time using the display device; and
   causing the saved temporary message to be presented in the temporary message interface in response to causing the content item to be presented at the subsequent time.

20. The non-transitory computer-readable medium of claim 15, wherein the permanent message includes the content item and the endorsement information.

21. The non-transitory computer-readable medium of claim 15, wherein the user input received in connection with the temporary messaging interface includes user input to add text to the temporary message.

* * * * *